United States Patent
Saraya

(10) Patent No.: US 9,720,891 B2
(45) Date of Patent: *Aug. 1, 2017

(54) MANAGING FILE CHANGES MADE DURING A REVIEW PROCESS

(71) Applicant: International Business Machines Corporation, Armonk, NY (US)

(72) Inventor: Siddharth K. Saraya, Raniganj (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,890

(22) Filed: Sep. 15, 2016

(65) Prior Publication Data

US 2016/0381156 A1 Dec. 29, 2016

Related U.S. Application Data

(63) Continuation of application No. 14/959,292, filed on Dec. 4, 2015, now Pat. No. 9,471,588, which is a continuation of application No. 14/732,825, filed on Jun. 8, 2015.

(51) Int. Cl.
G06F 17/30 (2006.01)
G06F 17/22 (2006.01)
G06Q 10/10 (2012.01)
G06F 3/14 (2006.01)
G06F 17/24 (2006.01)
H04L 29/08 (2006.01)

(52) U.S. Cl.
CPC ........ *G06F 17/2288* (2013.01); *G06F 3/1462* (2013.01); *G06F 17/24* (2013.01); *G06F 17/241* (2013.01); *G06F 17/30168* (2013.01); *G06F 17/30174* (2013.01); *G06F 17/30194* (2013.01); *G06Q 10/10* (2013.01); *G06Q 10/101* (2013.01); *H04L 67/06* (2013.01); *H04L 67/18* (2013.01); *H04L 67/22* (2013.01)

(58) Field of Classification Search
CPC ................... G06F 17/30168; G06F 17/30194
See application file for complete search history.

(56) References Cited

U.S. PATENT DOCUMENTS

| | | |
|---|---|---|
| 8,453,052 B1 | 5/2013 | Newman et al. |
| 9,471,588 B1 | 10/2016 | Saraya |
| 2006/0064634 A1* | 3/2006 | Dettinger .......... G06F 17/30067 715/255 |
| 2012/0159355 A1 | 6/2012 | Fish et al. |
| 2013/0262373 A1 | 10/2013 | Rampson |

(Continued)

OTHER PUBLICATIONS

Saraya, Siddharth K., "Managing File Changes Made During a Review Process", U.S. Appl. No. 14/732,825, filed Jun. 8, 2015, 24 pages.

(Continued)

*Primary Examiner* — Grace Park
(74) *Attorney, Agent, or Firm* — Lance I. Hochhauser

(57) ABSTRACT

A method for managing file changes is provided. A file editor is able to view if the file he is submitting for review, is already under review with any reviewer. A reviewer would be informed that another editor has edited the same file and has submitted his changes for review. Editors would be informed of all reviewer comments if there are multiple reviewers on one file.

1 Claim, 3 Drawing Sheets

(56) References Cited

U.S. PATENT DOCUMENTS

2015/0052427 A1 2/2015 Vagell et al.
2015/0317294 A1 11/2015 Massand

OTHER PUBLICATIONS

Saraya, Siddharth K., "Managing File Changes Made During a Review Process", U.S. Appl. No. 15/293,704, filed Oct. 14, 2016, 22 pages.

IBM, Appendix P "List of IBM Patents or Patent Applications Treated as Related", dated Nov. 3, 2016, 2 pages.

\* cited by examiner

MANAGING FILE CHANGES MADE DURING A REVIEW PROCESS

BACKGROUND OF THE INVENTION

The present invention relates generally to the field of online file management, and more particularly to management of file changes.

Online file management and file collaboration allow for storing, organizing, viewing, and modifying files with an Internet connection. Document version control, audit trails, locking, document commenting, uploading, downloading, browsing, searching, indexing, categorizing, and tracking can be performed through an Internet connection from anywhere at any time. File collaboration also allows colleagues, partners, and/or customers to collaborate on files.

In a scenario where members of a team may be distributed at multiple places over a geographic location, each member of the team may be editing copies of a same file. As the team members feel that they have done their changes, they deliver their copies having changes made in them to a stream which becomes one of a set of versions of the same file.

SUMMARY

In one aspect of the present invention, a method, a computer program product, and a system includes: receiving a first file from a first editor for review by a first reviewer; establishing a review identifier (ID) that associates the first reviewer with the first file; receiving a second file from a second editor including a set of changes with respect to the first file for review by a second reviewer; revising the review ID to associate the second reviewer and the second file with the first file; receiving a first comment on the first file from the first reviewer; and revising the review ID to associate the first comment with the first file.

DETAILED DESCRIPTION

Figure 1:
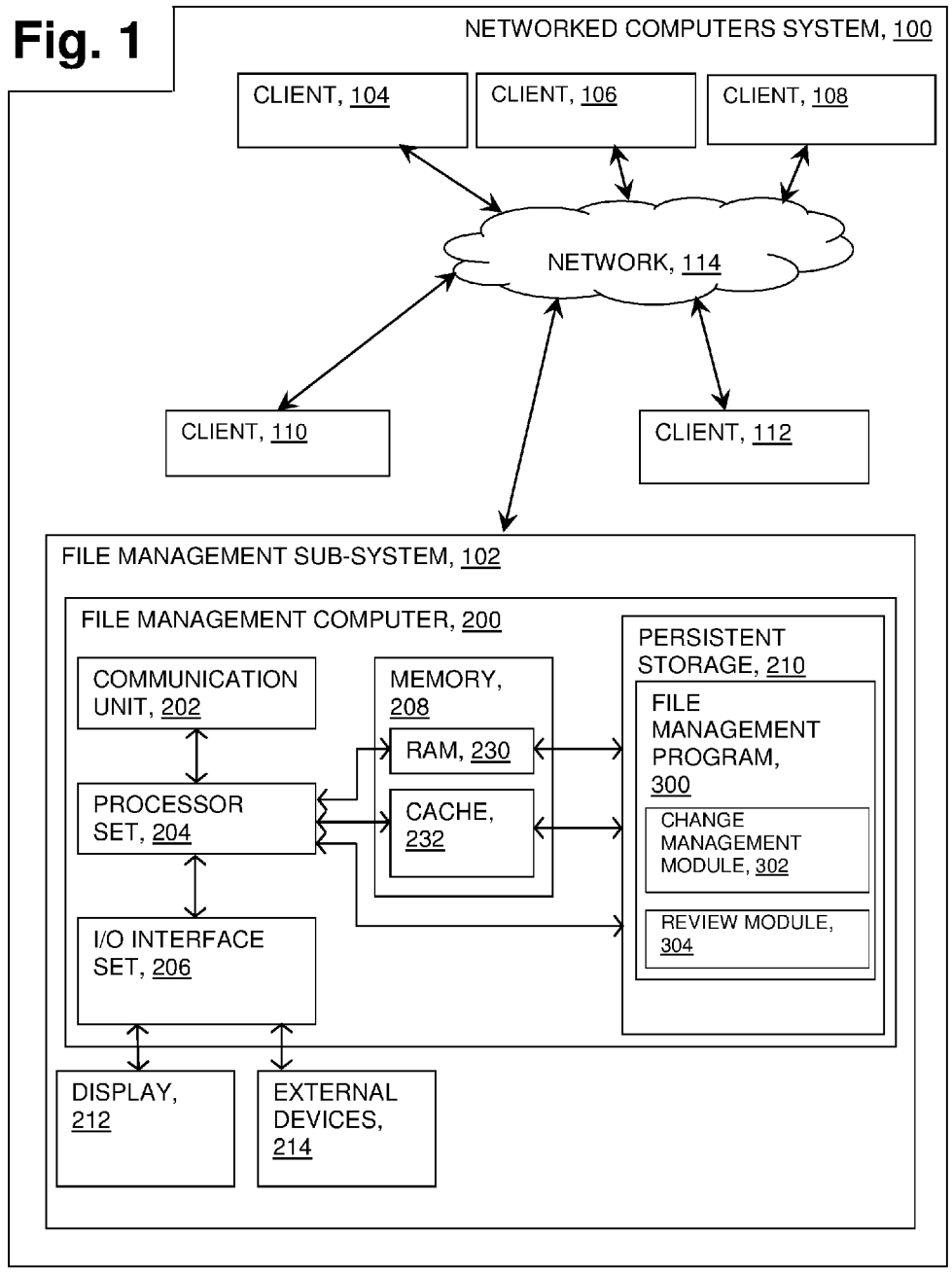
FIG. 1 is a schematic view of a first embodiment of a system according to the present invention.

A solution is provided according to some embodiments of the present invention to be able to link files that are to be reviewed, such that file editors and reviewers can be prompted that a same file is under review and a reviewer can collectively review all the file changes together submitted by editors. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: file management sub-system 102; client sub-systems 104, 106, 108, 110, 112; communication network 114; file management computer 200; communication unit 202; processor set 204; input/output (I/O) interface set 206; memory device 208; persistent storage device 210; display device 212; external device set 214; random access memory (RAM) devices 230; cache memory device 232; file management program 300; change management module 302; and review module 304.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with scheduling computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

In addition to other file management functions (not shown), program 300 includes change management module (mod) 302 and review mod 304. Alternatively, the review mod is part of the change management mod. Alternatively, the review mod is a standalone program that is not incorporated in the change management mod. In some embodiments of the present invention, program 300 operates to collaborate and prompt both file editors and file change reviewers while files are being changed in parallel by the editors and reviewed by reviewers.

Some embodiments of the present invention recognize the following facts, potential problems and/or potential areas for improvement with respect to the current state of the art: (i) file editors need to get their changes reviewed prior to delivering their individual changes to form a file version; (ii) one or more file editors could change a same file and submit their corresponding changes to one or more reviewers for review; (iii) a mechanism is needed where a file can be traced to determine which editor edits the file and which reviewer reviews the file; (iv) editors and reviewers can be prompted that a same file is under review; and/or (v) a reviewer is aware of all the changes being made in the same file by multiple editors so that the reviewer can review all the changes together and avoids the effort of reviewing each change individually.

On a geographically distributed team where each team member is distributed at multiple places over a geographic region, each member of the team may be working on a same file, for example, editing the same file. A member of the distributed team could have the role of a reviewer of the file changes, or the role of an editor for editing or changing the file. The file being edited at the same time as the review is managed by change management tools, such as change management mod 302 in FIG. 1, where the file is allowed to be edited by each team member, for example client 104 and client 106. Each editor has a copy of a version of the file, which they can edit independently. As the team members complete their changes, they deliver their changes to a change stream serving as a repository where the latest updated files are managed. In that way, if an editor makes changes in a file, the editor has to deliver the changes to the change stream, such that the current latest version of the file the editor has updated with the changes to generate a new latest version of the file.

Prior to delivering ones individual changes to form a file version, a file editor needs to get their changes reviewed. There could be two or more file editors changing a same file and submitting their changes to one or multiple reviewers for reviewing. The different editors of one file can submit for review the file to multiple reviewers. Additionally, each editor can submit the same file to multiple reviewers.

Herein a solution is required in a review tool (e.g., the review mod 304 in FIG. 1) to be able to link the files to be reviewed, so that editors and reviewers can be prompted that the same file is under review and a reviewer can collectively review all the changes together. That is, a mechanism is required where a file can be traced to see that the file is under edit by which editors and under review by which reviewers. A reviewer can be aware of all the changes being made in the same file by multiple editors so that the reviewer can review all together and avoid the effort of reviewing it individually.

In some embodiments of the present invention, a review tool (e.g., the review mod 304 in FIG. 1) can be saving the files with unique file identifiers where the files refer to all files stored in the change management tool irrespective of the file being edited or not. In one example, the unique file identifier is any alpha-numeric code that acts as a primary key to identify a file, for example, "aaa222aaa."

In some embodiments of the present invention, if the files are being managed in a different change management tool (i.e., a review tool is a standalone tool not incorporated in the change management tool), the review tool saves unique file references to the files stored on the change management tool. An example of the unique file reference has the primary key of the file, which is a unique file identifier, for example, bbb222bbb. Using this primary key the same file is fetched in both the change management tool and the review tool.

In some embodiments of the present invention, the review tool needs to be linked to the change management tool so that the review tool has all the files synchronized from the change management tool, irrespective of the review tool being a part of the change management tool or a standalone tool. The files in the change management tool need to be in sync with the review tool.

For example, a file is already submitted by a first editor for review by a first reviewer. When a second editor submits his changes for review, the second editor is informed that the same file is already under review with the first reviewer. The second editor may choose to send the file to the first reviewer. In that way, there is only one reviewer. The first reviewer is also informed that there are changes in the file by the second editor. The first reviewer may choose to review the file in its entirety with all the changes submitted for review. Alternatively, the second editor has the file changes reviewed by a second reviewer.

Figure 2:
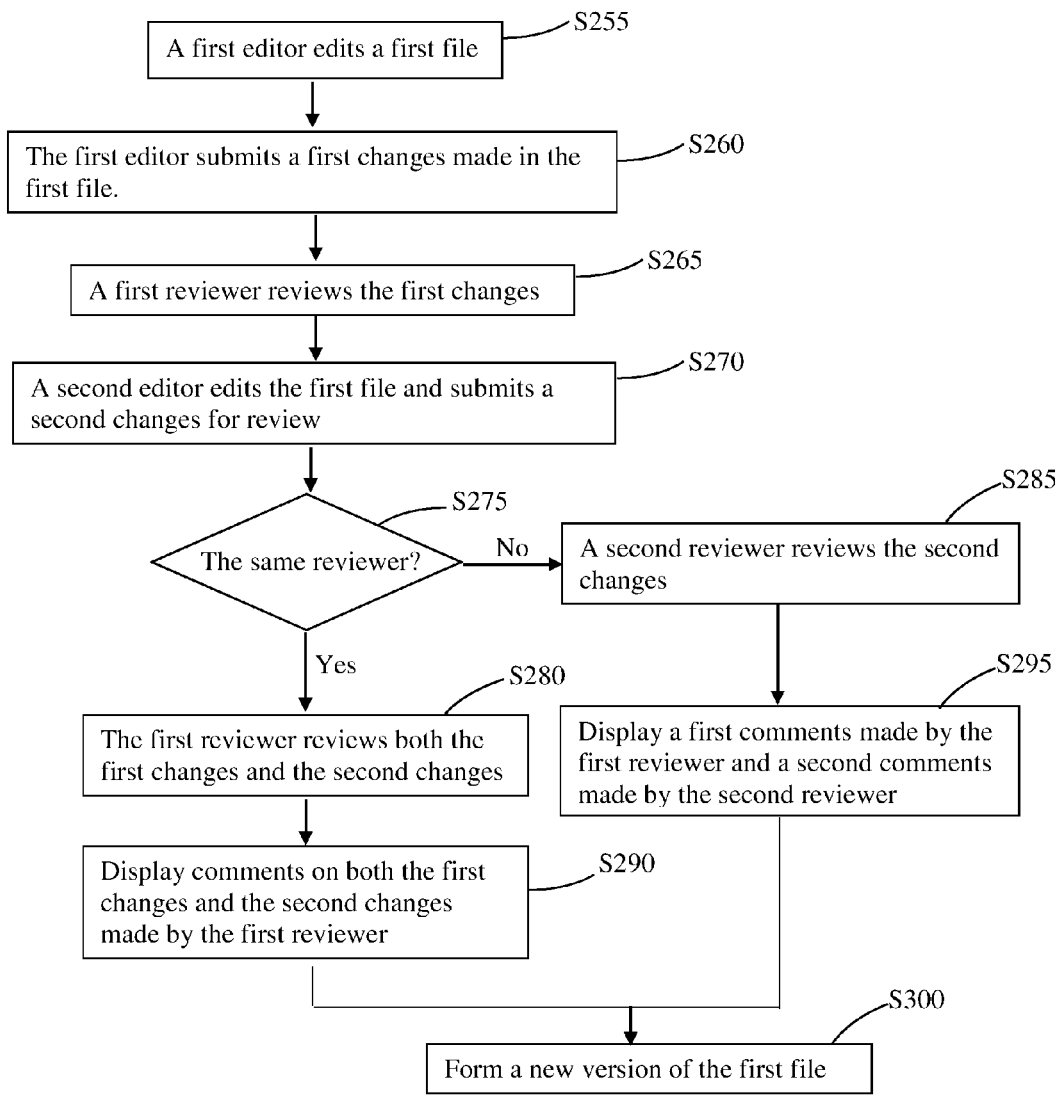
FIG. 2 is a flowchart showing a method performed, at least in part, by the first embodiment system.
Figure 3:
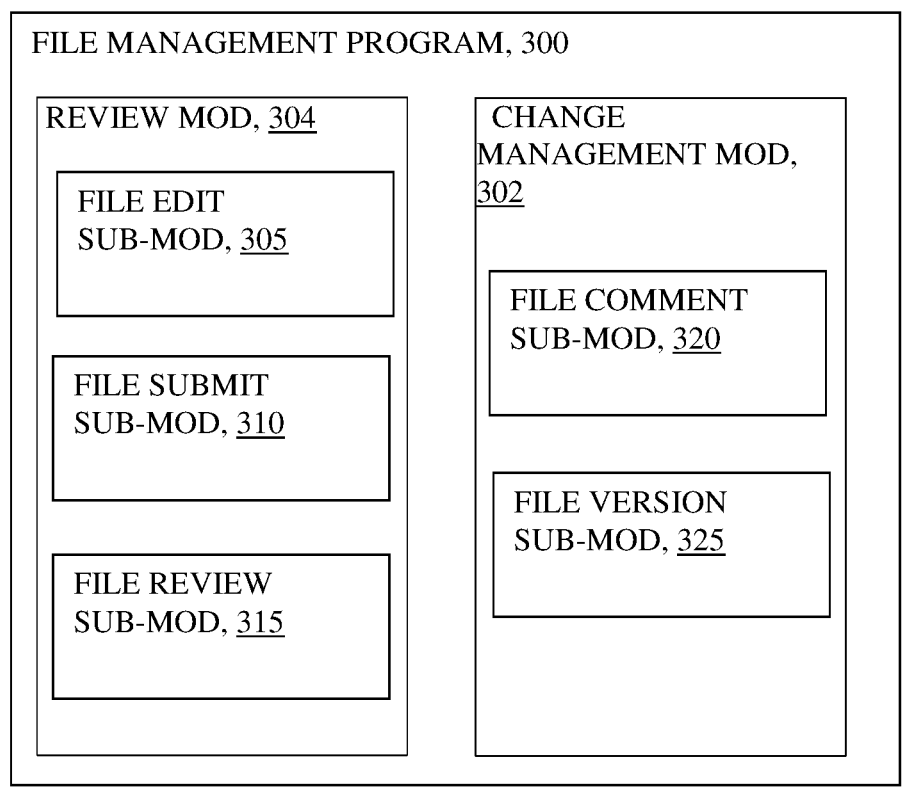
FIG. 3 is a schematic view of a machine logic (for example, software) portion of the first embodiment system.

FIG. 2 shows flowchart 250 depicting a first method according to the present invention. FIG. 3 shows scheduling program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing proceeds to step S255 where file edit sub-module (sub-mod) 305 is used to edit, or otherwise modify, a file. In this exemplary embodiment, a first editor changes a first file, for example, by adding a picture to the first file. Herein the changes made by the first editor are referred to as a first changes. The first file may be edited and/or changes made by multiple other editors in parallel, separately, and/or concurrently. As mentioned previously, both the first editor and the multiple other editors are each a member of a distributed team who might be working from different geographic locations and editing the same file. In this embodiments, the first files is stored in a change management tool (i.e., change management mod 302 in FIG. 1).

Processing proceeds to step S260, where file submit sub-mod 310 is used to submit changes made on a file by an editor to a reviewer for reviewing the changes. In this example, once the first editor completes adding the picture to the first file, the first editor submits the first changes to a first reviewer for review. Here upon submitting the first changes for review, the review mod 304 would save a unique file identifier to the first file to be reviewed.

Processing proceeds to step S265, where file review sub-mod 315 is used to review file changes by a reviewer. In this example, once the first file changes are submitted to the first reviewer for review, the first reviewer starts his review. Herein a reviewer unique identifier, also referred to as a review identifier (ID), for the first reviewer is saved with the first file. The reviewer unique identifier is a primary key identifying the first reviewer.

Processing proceeds to step S270, where file edit sub-mod 305 and file submit sub-mod 310 are used to edit a same file by other editors and submits file changes by other editors for reviewing. In this exemplary embodiment, while the first reviewer is reviewing the first changes of the first file submitted by the first editor, a second editor edits the first file separately, for example, by deleting a line of text, and submits his changes (herein referred to as a second change) for review. Herein the second editor may be another member of the distributed team. Alternatively, the second editor may be the same member as the first editor who makes another file changes for the first file after submitting his first file changes.

When the second editor initiates the submit for reviewing his changes of the first file, the review mod 304 would search all the files already submitted for review using their unique file identifier. The review mod 304 performs the search by deciphering the file unique primary key from the first file being submitted for review. And based on the unique file identifier the review mod 304 would fetch if the first file is already submitted for review. Here upon finding the first file being a part of active review, the second editor is prompted with the first file name and the current reviewer of the first file, so that the second editor knows who the current reviewer of the first file is.

Processing proceeds to step S275, where file submit sub-mod 310 is used to determine whether another editor of a same file chooses to submits his file changes to a same reviewer of the same file. In this example, the second editor may choose to add his changes of the first file to the same first reviewer or choose a different file reviewer.

If "Yes" branch is selected from step S275, processing proceeds to step S280, where file review sub-mod 315 is used by a same reviewer to review all the changes of a same file submitted by all the editors. In this exemplary, the second editor of the first file chooses to submit his changes of the first file to the first reviewer for review. The first reviewer is informed that the first file he is working on is submitted by the second editor for reviewing the second changes. This would be done by matching the files to the unique file identifier.

The first reviewer is able to see both the first changes and the second changes. The first reviewer may see both the changes at the same time, for example, by dividing the screen into two panes. Alternatively, the first reviewer may choose to see one changes at a time by, for example, displaying only the first changes on the screen. The changes would be displayed in different views differentiating them from the base file version (i.e., the existing version). Alternatively, if the first file with the first changes and the first file with the second changes can be merged, then the first file could be shown as one merged file with both the first change and the second changes to the first reviewer.

Processing proceeds to step S290, where file comment sub-mod 320 is used to display comments made by a same reviewer on all the changes of a same file submitted by all the editors. In this example, the first reviewer makes comments on both the first changes and the second changes. Each comments made by the first reviewer is assigned by the change management mod 302 a comment identifier which is a primary key associated with each comment. Upon saving of the comments, the first file identifier and each comment identifier are saved. The comment identifier is saved in relation with the file identifier to identify all the comments associated with the file. Based on the comments and file related data saved, comments made by the first reviewer are fetched and displayed to both the first editor and the second editor.

Processing proceeds to step S300, where file version sub-mod 325 is used by all the editors of a same file to form a new version of the edited file. In this example, the first reviewer reviews all the changes and adds comments on those changes. The editing and changing of the first file based on the comments of the first reviewer are done by the respective editors (i.e., the first editor and the second editor), for example, the first editor may delete the picture instead of adding the picture to the first file based on the comment of the picture. According to the final changes made by the editors, the editors merge their changes and then deliver to the stream which has all the changes. This makes a new version of the first file, for example, the first file may now be renamed as a second file.

If "No" branch is selected from step S275, processing proceeds to step S285, where file review sub-mod 315 is used by a different reviewer to review the changes of a same file submitted by a different editor. In this exemplary, the second editor of the first file chooses to submit his changes of the first file to a different reviewer (i.e., a second reviewer) for review. Both the first editor and the second editor would be informed of the first file being present for review with the names of both the first reviewer and the second reviewer. Each reviewer makes comments on the respective changes to the first file under review with him.

Processing proceeds to step S295, where file comment sub-mod 320 is used to display comments made by the reviewers on all the changes of a same file submitted by all the editors. In this example, the first reviewer makes comments on the first changes and the second reviewer makes comments on the second changes. Each comment made by the reviewers is assigned by the change management mod 302 a comment identifier which is a primary key associated with each comment. Upon saving of the comments, the first file identifier and each comment identifier are saved. The comment identifier is saved in relation with the file identifier to identify all the comments associated with the file. Based on the comments and file related data saved, comments made by both reviewer are fetched and displayed to both the first editor and the second editor. Then processing proceeds to stop at step S300, where file version sub-mod 325 is used by all the editors of the first file to form a new version of the first file.

Alternatively, in a scenario where a file is directly uploaded on the review tool for review without that file being a part of the change management tool, then the file identifier is generated by the review tool. For each review, upon uploading the comments, the reviewer would be related to this unique identifier, also referred to as a review identifier (ID), that is, the comments and files are linked using this file identifier and comment identifier.

Some embodiments of the present invention may include one, or more, of the following features, characteristics, and/or advantages: (i) a file editor is able to view if the file he is submitting for review, is already under review with any reviewer; (ii) a reviewer is informed that another editor has edited and submitted his changes for review for the same file the reviewer is reviewing; (iii) a reviewer is informed that who else are other reviewers for the same file, if there are some other reviewers reviewing the same file; (iv) a reviewer is informed of all reviewers' comments if there are multiple reviewers on a same file; and /or (v) a reviewer is enabled to see other reviewers' comments if needed.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product comprising:
a computer readable storage medium having stored thereon:
    first instructions executable by a device to cause the device to receive a first file from a first editor for review by a first reviewer, wherein the first file is based on an original file including a first set of changes made to the original file;
    second instructions executable by a device to cause the device to establish a review identifier (ID) that associates the first reviewer with the first file;
    third instructions executable by a device to cause the device to receive a second file from a second editor for review by a second reviewer, wherein the second file is based on the original file and includes a second set of changes made by the second editor to the original file;
    fourth instructions executable by a device to cause the device to revise the review ID to associate the second reviewer and the second file with the first file;
    fifth instructions executable by a device to cause the device to receive a first comment on the first file from the first reviewer;
    sixth instructions executable by a device to cause the device to revise the review ID to associate the first comment with the first file;
    seventh instructions executable by a device to cause the device to receive a second comment on the second file from the second reviewer;
    eighth instructions executable by a device to cause the device to revise the review ID to associate the second comment with the first file; and
    ninth instructions executable by a device to cause the device to generate a third file by modifying the first file to include the second set of changes, the first comment, and the second comment;
wherein:
    the first editor, the second editor, the first reviewer, and the second reviewer access the first file and the second file from geographically remote locations,
    the first editor and the second editor use a change management tool,
    the first reviewer and the second reviewer use a standalone review tool not incorporated in the change management tool, and
    the standalone review tool is linked to the change management tool so that the standalone review tool has all the files synchronized from the change management tool.

* * * * *